United States Patent
Young

(10) Patent No.: US 8,122,027 B2
(45) Date of Patent: Feb. 21, 2012

(54) MESSAGE FILTERING

(75) Inventor: Neil G S Young, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 2760 days.

(21) Appl. No.: 10/315,562

(22) Filed: Dec. 10, 2002

(65) Prior Publication Data

US 2003/0120785 A1    Jun. 26, 2003

(30) Foreign Application Priority Data

Dec. 20, 2001  (GB) .................................. 0130626.5

(51) Int. Cl.
*G06F 7/00* (2006.01)
*G06F 17/30* (2006.01)

(52) U.S. Cl. ...................................................... 707/738

(58) Field of Classification Search ................. 707/2, 3, 707/4, 9, 10, 738; 709/219; 725/144; 348/14.01
See application file for complete search history.

(56) References Cited

U.S. PATENT DOCUMENTS

| | | | | |
|---|---|---|---|---|
| 5,276,870 A * | 1/1994 | Shan et al. | ......................... | 707/2 |
| 5,388,259 A * | 2/1995 | Fleischman et al. | .............. | 707/5 |
| 5,813,000 A * | 9/1998 | Furlani | ............................. | 707/3 |
| 6,021,433 A * | 2/2000 | Payne et al. | .................... | 709/219 |
| 6,105,023 A * | 8/2000 | Callan | ............................... | 707/5 |
| 6,332,163 B1 * | 12/2001 | Bowman-Amuah | ........... | 709/231 |
| 6,643,650 B1 * | 11/2003 | Slaughter et al. | ............... | 707/10 |
| 6,718,371 B1 * | 4/2004 | Lowry et al. | .................... | 709/213 |
| 6,889,358 B1 * | 5/2005 | Lieuwen et al. | ............... | 715/500 |
| 6,901,383 B1 * | 5/2005 | Ricketts et al. | .................. | 705/37 |
| 2003/0126136 A1 * | 7/2003 | Omoigui | .......................... | 707/10 |

* cited by examiner

*Primary Examiner* — Brent Stace
(74) *Attorney, Agent, or Firm* — Law Office of Jim Boice

(57) ABSTRACT

The invention relates to a communications manager for receiving publications and forwarding these publications on to parties who have subscribed to receive such publications. The communications manager is able to store a plurality of filter expressions independently of the process of registering subscriptions, with each filter expression being stored in an optimized format. Means are provided for permitting the optimized format of a stored filter expression to be referenced by a party wishing to receive publications filtered according to that filter expression and publications received can be parsed against the optimized filter expression in order to determine which publications should be forwarded on to the party concerned.

18 Claims, 9 Drawing Sheets

| Retained Publication Set | Filter Alias |
|---|---|
| Set1 | X |
| Set2 | Y |
| Set3 | Z |

Figure 7b

MESSAGE FILTERING

FIELD OF THE INVENTION

The present invention relates to the field of data processing and more specifically to a data processing system which distributes messages from suppliers (publishers) of data messages to consumers (subscribers) of such messages.

BACKGROUND OF THE INVENTION

Publish/subscribe data processing systems have become very popular in recent years as a way of distributing data messages. Publishers are not concerned with where their publications are going, and subscribers are not interested in where the messages they receive have come from. Instead, a message broker typically assures the integrity of the message source, and manages the distribution of the message according to the valid subscriptions registered in the broker.

Publishers and subscribers may also interact with a network of brokers, each one of which propagates subscriptions and forwards publications to other brokers within the network. Therefore, when the term "broker" is used herein it should be taken as encompassing a single broker or multiple brokers working together as a network to act as a single broker.

FIG. 1 illustrates a typical publish/subscribe data processing system according to the prior art. A message broker 15 has an input mechanism 20 which may be, for example, an input queue or a synchronous input node by which messages are input when they are sent by a publisher 5; 10 to the message broker. A published message is fetched from the input mechanism by a controller 40 and processed to determine, amongst other things, to which subscribers 60; 65; 70 the message should be sent.

Message topics typically provide the key to the delivery of messages between publishers and subscribers. The broker attempts to match a topic string on a published message with a list of clients who have subscribed to receive publications including that topic string. A matching engine 30 is provided in the message broker for this very purpose. When the subscriber registers, it must typically specify a means by which it wants to receive messages (which may be a queue or other input mechanism) and a definition of the types of messages that it is interested in. A subscriber can specify that it wishes to receive messages including a topic string such as "employee/salary" and any messages matching that topic string will be identified and forwarded on to the subscriber via an output mechanism 50. (Note, there may be more than one input and output mechanism to and from which messages are received and sent by the message broker.)

It will be appreciated however that a subscriber to even a single topic may still receive a wealth of material that they are not actually interested in. It is therefore possible to further narrow the scope of a subscription by requesting only those publications having a specific content via the use of filters. For example, a subscription to the topic "employee/salary" might request only those messages published to that topic where the sum of the salary AND the bonus is equal to or greater than £30,000.

FIG. 2 shows the processing performed at the broker in response to registration by a subscriber in accordance with the prior art. A subscriber typically sends a message to the broker to register their subscription. This may be of the form topic=employee/salary; filter=salary+bonus>30000. This is received at the broker and is interrogated by the matching engine in order to create a parsed representation of the subscription, which can be used to determine whether any publications received at the broker match the needs of the subscriber. The parsed representation is created in a match space 150 within the matching engine and typically consists of a hierarchical tree structure comprising a number of nodes depending either directly or indirectly from a root node. As can be seen from the example topic string given, a topic string may comprise a number of topic levels. Each one is stored as a node in the tree structure, with the first level topic name, employee, depending directly from the root node and each subsequent level depending from the previous level's node. Thus in the example, a salary node depends from the employee node. Information pertaining to the filter specified is then added into the tree structure. In the example given, a comparison needs to be done to determine whether an employee's salary plus their bonus equals an amount greater than 30,000. Therefore a "comparison" node depends from the salary node. Dependent upon that node is an "addition" node for carrying out an addition between two identifier nodes: salary; and bonus (both currently having no value). The addition is to be compared against a "constant" node containing the value 30,000.

Note, the filter information is typically stored in the match space separately from the main topic tree and takes the form of individual filter sub-trees Pointers then point from the topic tree to the filter sub-trees (multiple topic branches may point to the same sub-tree to aid reusability). FIG. 2, however, shows the complete picture.

When a publication is received at the message broker it can be parsed against the structure shown in FIG. 2 to determine whether there are any matches. FIG. 3 shows an exemplary format of a publication message according to the prior art. Such a message 120 consists of a header 100 and a payload 110. The header provides the information that the receiving system needs to know about the message including delivery details and message parameters and typically includes a description of the topic of the message as shown in the figure. The payload carries the actual data of the message and in this example contains an employee id; employee salary; and employee bonus.

Referring back to FIG. 2, the topic string in the publication message 120, is parsed through the tree structure to look for any matches. In this instance an employee node is found, as is a salary node (i.e. these correspond to the employee and salary data fields in payload 110). The values of these data fields are then input to these two nodes; added together; and then compared against the constant node. A value of TRUE or FALSE is returned dependent upon whether the total of this particular employee's salary and bonus is greater than 30,000. Since the addition comes to 31,000, a value of TRUE is returned to a selector node which sits between the last topic node (salary) and the first filter node (comparison predicate). (Note, there is typically a selector node for each topic branch.) The messages is therefore forwarded on to any subscribers who have previously specified such a filter to narrow down the scope of messages received. Typically a couple of distribution lists of subscribers are attached to the selector node and correlated with the appropriate sub-tree (each sub-tree is named—e.g. 1) such that the broker knows who to forward messages on to. Of course the distribution lists do not have to be associated with this node, indeed a selector node may not even exist. Instead the lists may, for example, be associated with the salary node (i.e. the last topic node). A table 156 lists those subscribers who have not scoped their messages with a filter, and a table 157 lists those subscribers who have specified a filter. The tables typically list subscribers by subscriber id. It is the appropriate selector node which typically makes the decision as to which subscribers to send a publication onto.

Thus as previously mentioned in order for matching to be possible at publication time, each time a subscription is registered it is parsed into the hierarchical tree structure and each time a subscription is unregistered, it has to be removed from the tree structure. The number of subscriptions registered can be large and may be volatile. Consequently this is not a trivial task. Furthermore even when a new subscription is identical to a previously registered subscription (or even just the filter part of that subscription is identical), the subscription still has to be parsed though the existing tree structure to determine this, even if a part of the tree structure does not have to be created because it already exists. This is processor intensive and unnecessary.

There is a further related problem with prior art systems. In a typical publish/subscribe system, publications are received at the broker and forwarded straight on to their listed subscribers. No publications are actually stored at the broker. Thus if a subscriber subscribes to a particular topic in the hierarchy, they will only receive those publications which are sent to the broker subsequent to their registration. All publications received at the broker prior to a subscriber's registration are never seen by the subscriber.

To overcome this problem, retained publication systems are becoming more prevalent. In such a system, publications are stored at the broker. Every time a subscription is received at the broker, a parsed representation of the subscription (i.e. specified topic string and optionally filter expression) is created, if it does not exist already, and then the set of retained publications are searched to see whether any of them yield a match for the newly registered subscription. Any matches are then forwarded on to the subscriber, as are any new publications received at the broker subsequent to registration. The creation of a parsed representation and then evaluation of the retained publications to look for matches is also time consuming and processor intensive.

DISCLOSURE OF THE INVENTION

Accordingly, the invention provides a communications manager a communications manager for receiving publications and forwarding said publications on to parties who have subscribed to receive such publications, said communications manager comprising: means for storing a plurality of filter expressions independently of the process of registering subscriptions, each filter expression being stored in an optimised format; means for permitting the optimised format of a stored filter expression to be referenced by a party wishing to receive publications filtered according to that filter expression; and means for parsing publications received against said optimised filter expression in order to determine which publications should be forwarded on to said party.

This is different from the Applicant's European Patent application 759 591 in which filters are stored at the broker but not in an optimised format (i.e. a parsed/executable format against which incoming messages can be matched) as disclosed. The prior art does not therefore enjoy the advantages of the present invention which are discussed throughout.

This is further different from the paper "Scalable High-Performance Event Filtering for Dynamic Multi-point Applications by Douglas C Schmidt which does not disclose means for permitting an optimised format of a stored filter expression to be referenced by a party wishing to receive messages scoped according to that filter expression.

CSPF and BPF filters disclosed at page 3 of the above document differ from the presently claimed invention in that there is no means for storing a plurality of filter expressions independently of the process of registering subscriptions.

Preferably the communication manager is able to determine whether a filter should be stored in its optimised format thereat independently of the process of registering subscriptions. Filters can also be received in their non-optimised format at subscription registration time and once the non-optimised filter expression has been included in a subscription registration a pre-determined number of times, it is promoted to the pre-stored, directly referencable set.

Thus an optimised or parsed representation is preferably created for common (or popular) filters once at start-up (or when it is determined that a non-optimised filter expression has been included in a subscription registration a predetermined number of times) and this representation can then be directly referenced by a subscriber. Further, no verification is needed (as in the prior art) to determine that the filter is identical to a previous subscription. The processing cost is thus greatly reduced.

Preferably the optimised format of each filter expression comprises an hierarchical structure, with each element in the filter forming a node. For example if the full version of the filter expression is filter=salary+bonus>30000, then there would be a node for each of salary; bonus; +; >; and 30000.

Preferably it is also possible to specify a transient condition(s), as appropriate, and this too is stored in an optimised format. It is then possible to associate this stored transient condition with at least one party who has registered to receive publications, and publications, which would except for the transient condition be forwarded on to the at least one party, can then be parsed through the transient condition. The outcome of the parsing in relation to a publication determines whether, or not, the publication is forwarded onto that party who is associated with the transient condition.

This is useful because requirements needed to authorize access to a document from the communication manager may change on a temporary basis. Transient conditions provide the means to implement such a change in requirements without the need to restructure the format of the stored information.

According to a preferred embodiment, it is further possible to specify a group condition. When such a condition is specified, it is verified whether or not a party belongs to the group and the outcome of the verification determines whether the group condition is applied to a publication which would except for the group condition be forwarded to the party. Means are also provided, responsive to determining that that party does belong to the group, for applying the group condition to the publication. The outcome of this application determining whether the publication is forwarded on to the party.

For example, subscribers 1, 3 and 5 may have specified that they wish to receive all stock trades conducted by IBM® (IBM is a trademark of International Business Machines Corporation in the United States, other countries, or both). As a further constraint, a group condition may be applied to certain of those subscribers. Thus before forwarding a publication, which has evaluated to TRUE for a particular tree branch, to a list of associated subscribers, those subscribers are evaluated to determine whether they belong to a group for which a group condition has been specified (e.g. "TradeVolume>1000). If a subscriber is found to belong to such a group for which such a condition has been specified, the publication is only forwarded on to this subscriber if the group condition is found to evaluate to true (e.g. if the trade volume is greater than 1000).

In one embodiment it is also possible to retain publications. The communications manager is thus not simply a store and forward system. Instead copies of publications are forwarded on to parties who have subscribed to receive such publications, whilst a cache of the publications preferably remains in one central place. Because the publications are retained, it is easier to categorise these by optimised filter expressions. Thus upon receipt of a new subscription that specifies a filter that has already been evaluated against the set of retained publications (e.g. at startup or at some other time decoupled from the receipt of the subscription referring to the filter), there is no longer any need to verify that an optimised version of a filter expression does not already exist/create an optimised format of a filter expression, and then to evaluate all the retained messages against this optimised version of the filter expression. The amount of work that is required to process a subscription is therefore greatly reduced and the communications manager is more efficient.

According to a further aspect, the invention yet further provides a method for receiving publications and forwarding said publications on to parties who have subscribed to receive such publications, said method comprising: storing a plurality of filter expressions independently of the process of registering subscriptions, each filter expression being stored in an optimised format; permitting the optimised format of a stored filter expression to be referenced by a party wishing to receive publications filtered according to that filter expression; and parsing publications received against said optimised filter expression in order to determine which publications should be forwarded on to said party.

According to a preferred embodiment, the invention further provides a computer program comprising program code adapted to perform the method described above when said program is run on a computer.

Storing filters centrally also has a number of other advantages. Previously changes to filters required that any programs making use of those filters were rebuilt with the changes incorporated and also that registrations were redone. Where common filters were used (i.e. the same filter was specified in more than one subscription) this could be a particularly arduous task. The present invention preferably enables any changes to a filter(s) to be made centrally, a minimal number of times.

BRIEF DESCRIPTION OF THE DRAWINGS

A preferred embodiment of the present invention will now be described, by way of example only, and with reference to the following drawings:

FIGS. 7a and 7b illustrates the association of a filter with a set of retained publications in accordance with a preferred embodiment of the present invention.

DESCRIPTION OF THE PREFERRED EMBODIMENT

Figure 1:
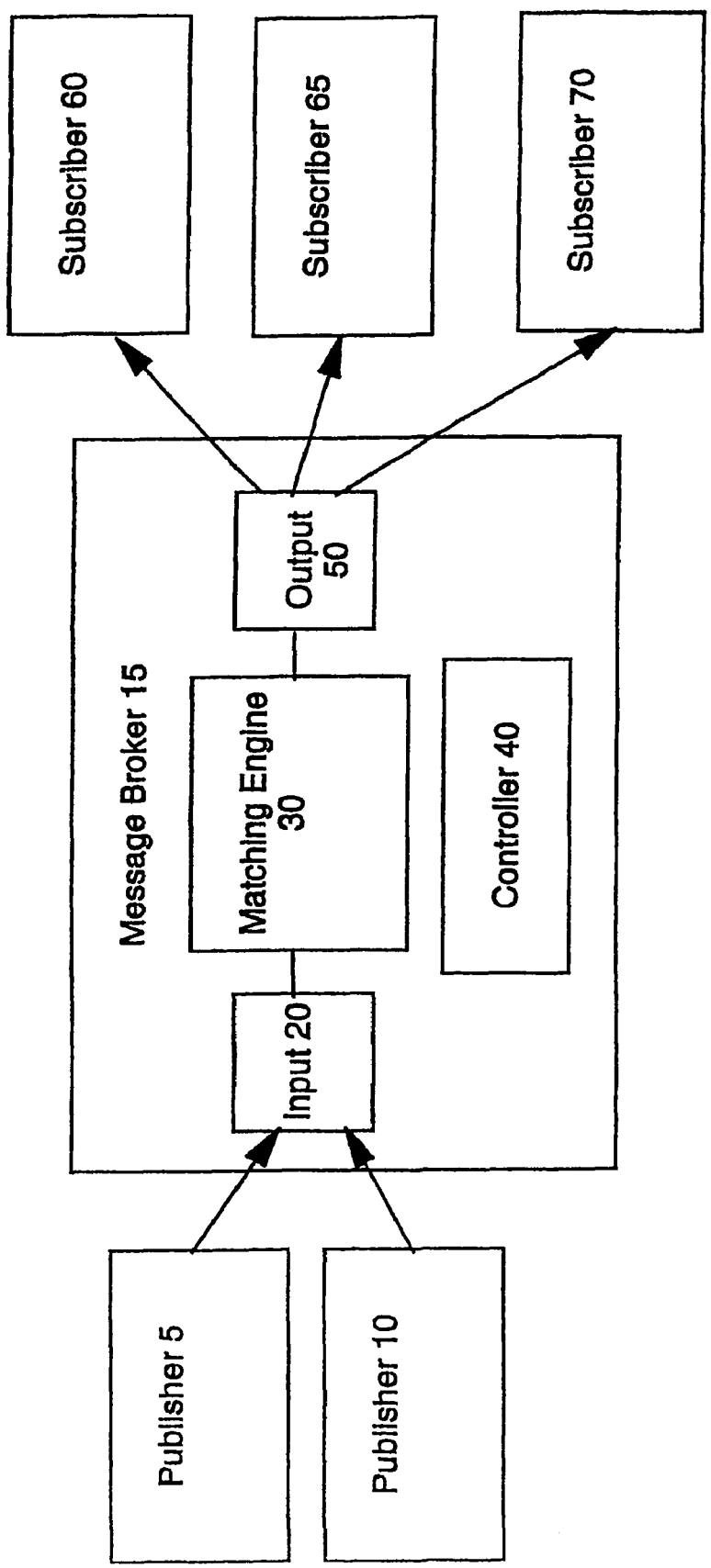
FIG. 1 illustrates a typical publish/subscribe data processing system according to the prior art.
Figure 2:
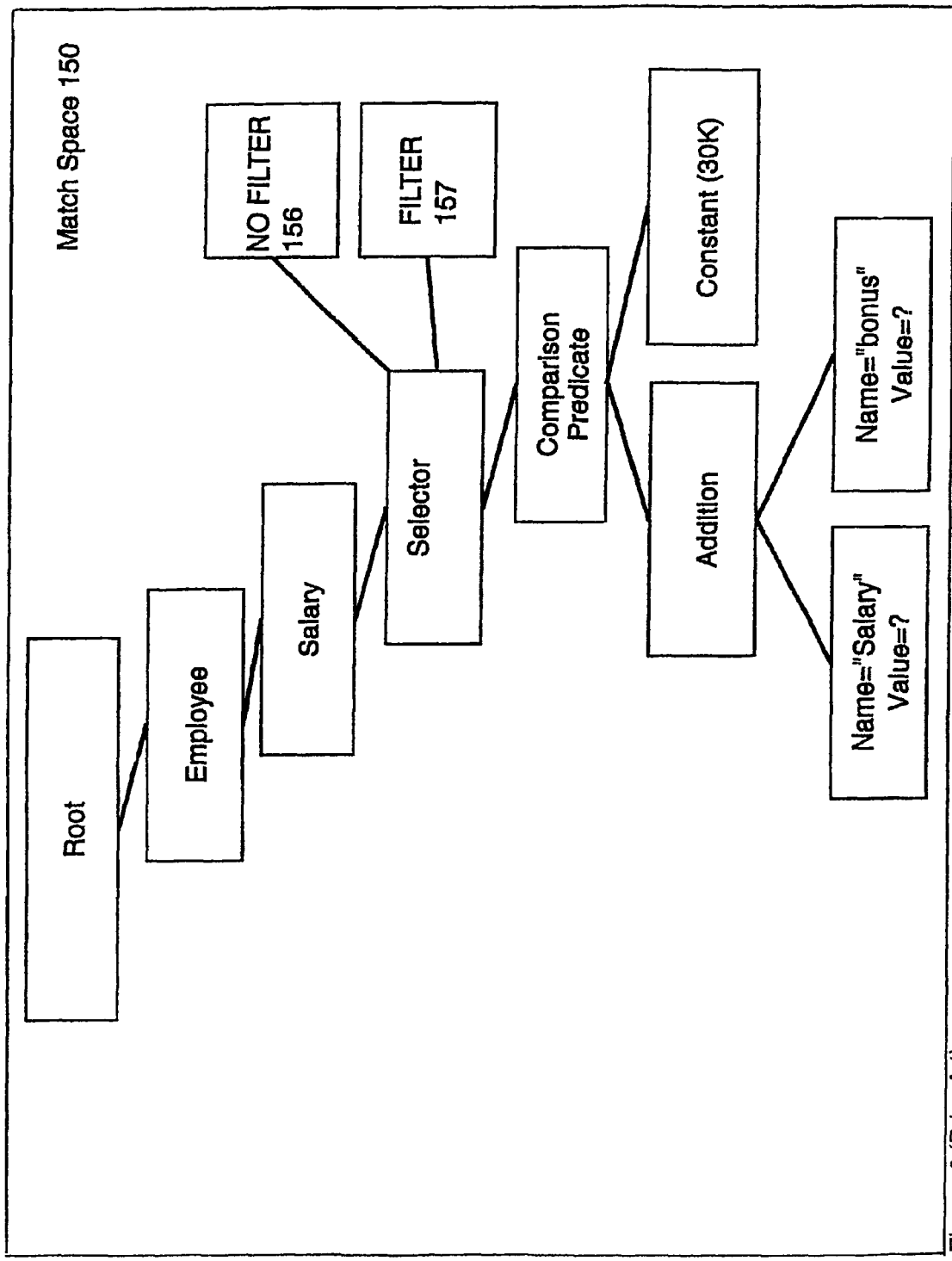
FIG. 2 shows the processing performed at the broker in response to registration by a subscriber in accordance with the prior art.
Figure 3:
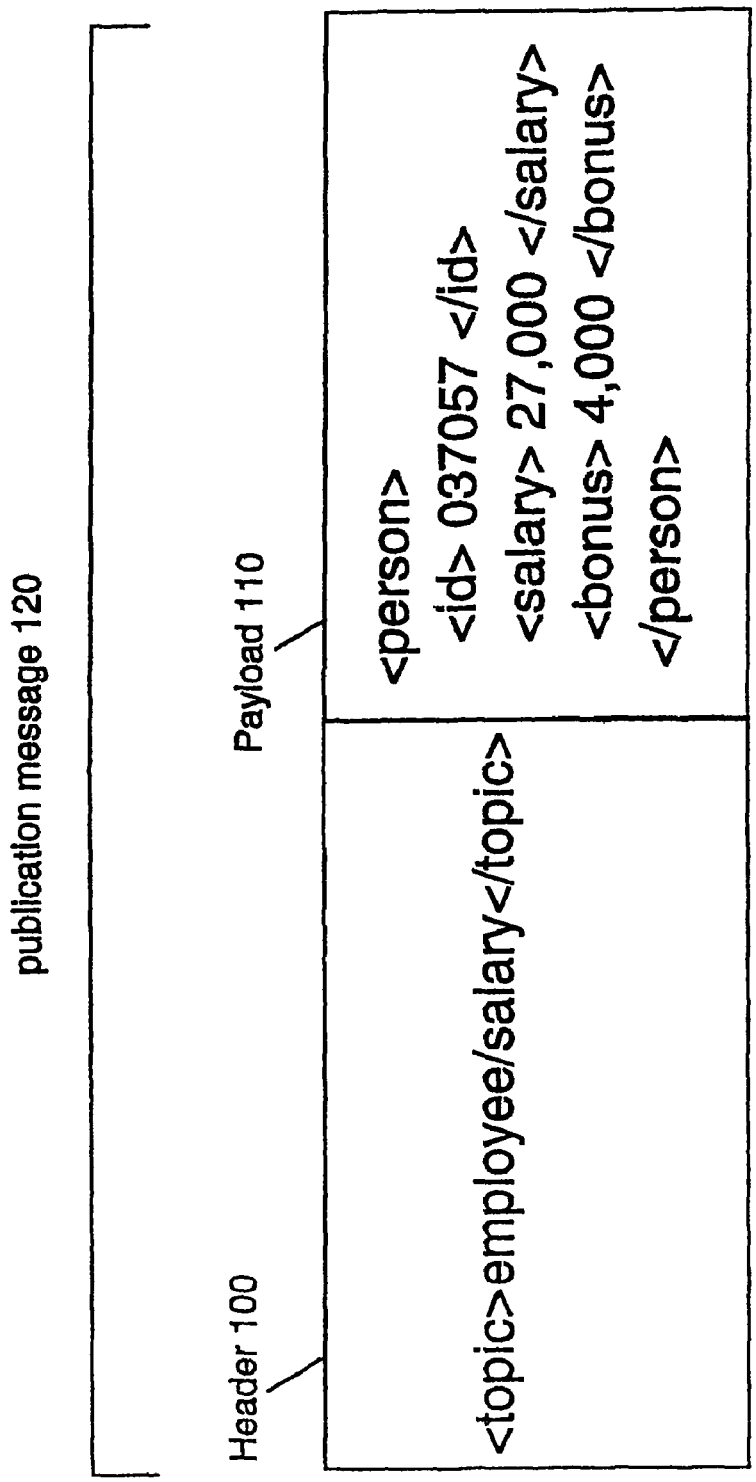
FIG. 3 shows an exemplary format of a publication message according to the prior art.
Figure 4:
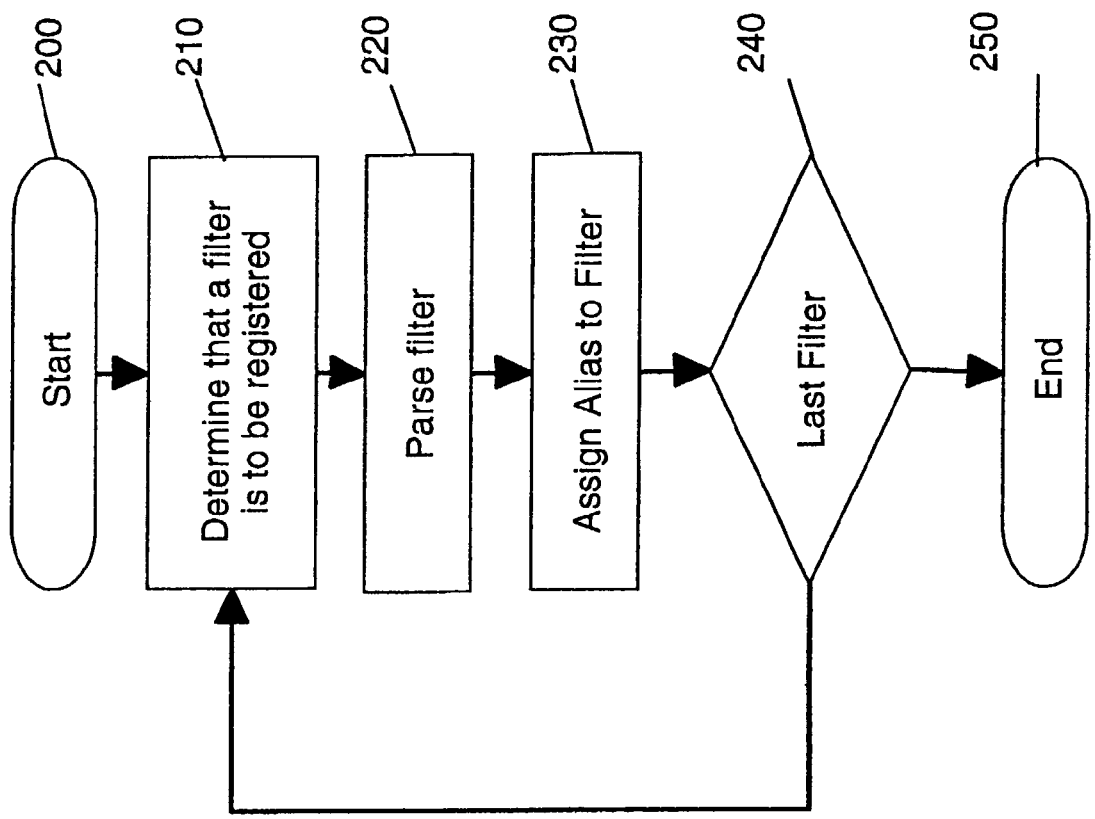
FIGS. 4 and 5 show how common filters are registered at start-up in accordance with a preferred embodiment of the present invention.

With reference to FIG. 4, it is determined at start-up that a filter is to be registered (step 200;210). The filter is turned into a parsed representation (e.g. a treelike structure (step 220)). The sub-tree corresponding to the filter is then assigned an alias (i.e. a short name) at step 230. (Note this may correspond to the root node of the sub-tree). At step 240, it is determined whether there are any more filters to register and if not, processing ends at step 250. Otherwise processing returns to step 210 and the next filter is registered. Note, as mentioned above the filter sub-trees are actually stored separately in the match space from the main topic structure. However in this instance, the topic part of the tree structure is preferably not yet created. Topic branches are added in at subscription registration time (see below) and topic branches point to filter sub-trees as appropriate. Thus logically there will be one overall structure once subscribers have registered with the broker. Note, it will be appreciated that more than one tree branch may point to the same filter sub-tree.

Figure 5:
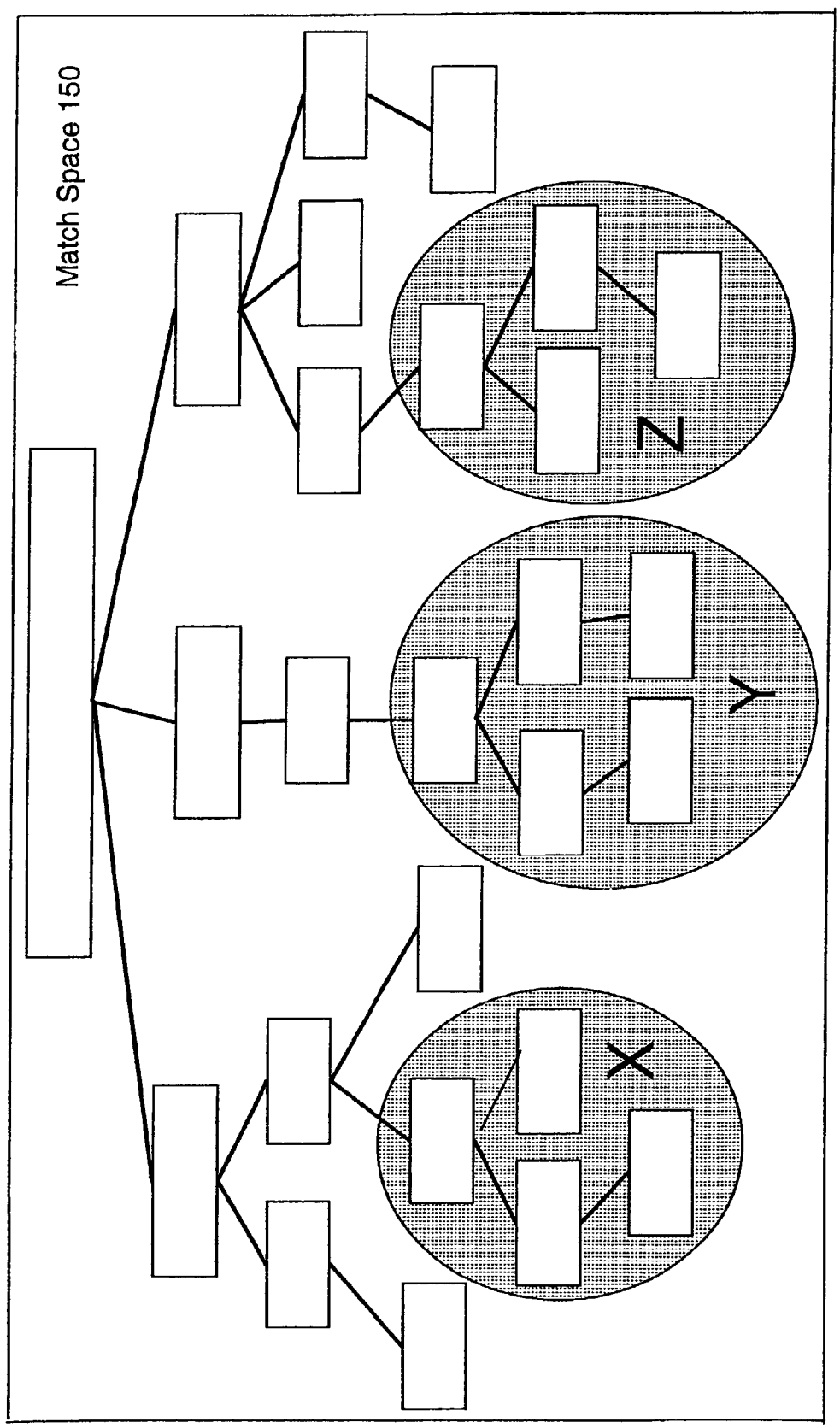

FIG. 5 shows how three filters, represented by three separate sub-trees within an overall hierarchical structure, have been assigned the aliases X, Y and Z (in reality the short names should of course be more meaningful). From the above, it should be appreciated that the diagram shows the complete logical structure, once the subscribers have registered with the broker. (Note, complete in the sense that the filter sub-trees are no longer unattached. It will however be appreciated that the tree structure will be continually changing as and when subscriptions are registered/unregistered.)

Figure 6:
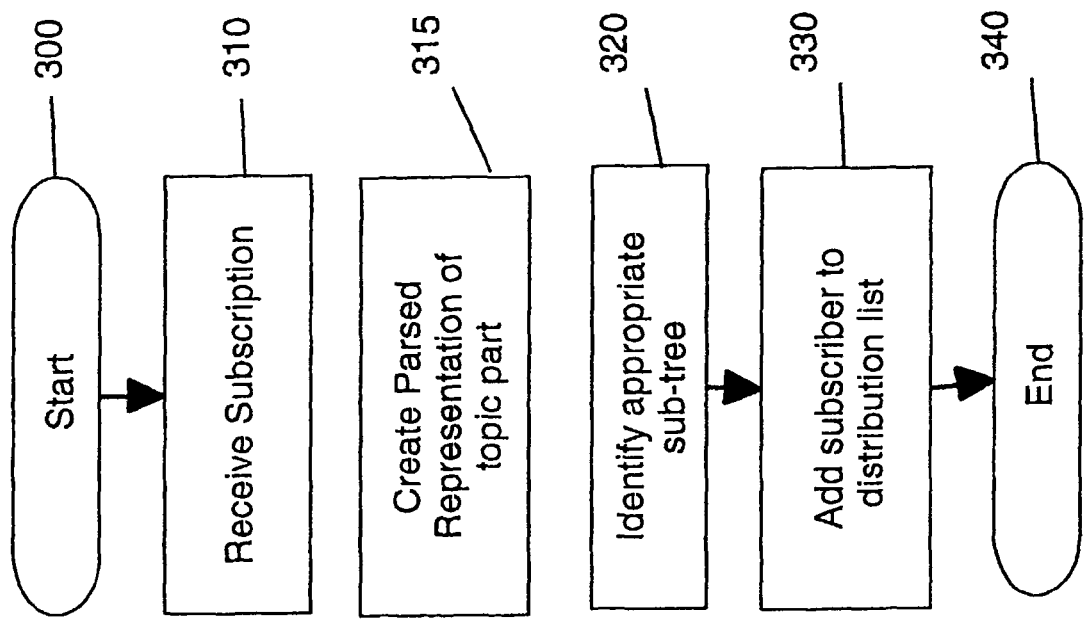
FIG. 6 is a flowchart of the processing that occurs upon receipt of a subscription in accordance with a preferred embodiment of the present invention.

FIG. 6 is a flowchart of the processing that occurs upon receipt of a subscription in accordance with a preferred embodiment of the present invention. A subscriber registers a subscription with the broker by submitting a message containing a subscription topic (e.g. topic=employee/salary) and a filter alias (e.g. X). This is received at the broker (step 300; 310) and, as alluded to above, a parsed representation is then created of the topic part of the registration and added into the overall tree-structure (step 315). (Note, first a check is done to verify that the topic part doesn't already exist in the overall tree structure.) The matching engine then identifies the sub-tree which corresponds to the filter alias (step 320) (e.g. via a table mapping aliases to expanded filters) and creates an association between the previously registered filter and the parsed topic representation just created. The subscriber is then added into the appropriate distribution list (step 330) in order to receive all publications, which when parsed through the appropriate part of the tree, evaluate to TRUE. The process then ends at terminator block 340. As mentioned in the prior art section, there are preferably at least a couple of tables associated with the selector node. One listing those subscribers who did not specify a filter and another table listing those subscribers who did so scope their messages. Of course, filter information may actually be stored in more than one table (e.g. one table per filter) and likewise with the topic only subscriber list. Further, the tables do not have to be associated with a selector node (indeed this may not even exist), but may for example be associated instead with a final topic node in each branch.

Thus common filters are typically parsed once at start-up only and when a subscriber actually registers, they need only specify the topic name in full, and an filter alias. Thus only a parsed representation of the topic part of the subscription has to be created upon the registration of a subscriber and an alias then provides a pointer to the correct sub-tree. The subscriber can be added into an appropriate distribution list straight-away. This is in contrast to the costly process of the prior art where a parsed representation has to be created of the topic part and/or the filter part for every subscription received at the broker and consisting of a new topic and/or filter, and even if the subscription being registered was identical to a previous one, it was still necessary to verify this within the tree structure.

Further in the past, changes to filters required that any programs making use of those filters were rebuilt with the changes incorporated and also that subscriptions were reregistered. Where common filters were used (i.e. the same filter was specified in more than one subscription) this could be a particularly arduous task. The present invention preferably enables any changes to a filter(s) to be made centrally, a minimal number of times.

In one embodiment, a management tool with a graphical user interface (GUI) front-end is used to define; change; and delete filter expressions centrally. Statistical analysis of the filter expressions specified by subscribers is also performed to determine the set of common filters to be stored at the broker. In a preferred embodiment, this analysis is dynamic. The broker records the number of times a new filter is specified (i.e. one which is not stored centrally at the broker in its parsed format for direct referencing by a subscriber). Once the filter has been specified a pre-determined number of times, the broker creates a parsed representation of the filter, stores this at the broker in the match space and assigns it an alias as discussed with reference to FIG. 4.

It will be appreciated that it is not essential for each filter to be correlated with an alias at the broker, but that such a setup is extremely advantageous. Filter expressions frequently include long and complicated syntax which is subject to programmer error and is difficult for the lay person to understand. Any syntax errors will typically not be detected until the operation that specifies the filter is performed (e.g. a subscription is registered). Further, such syntax is time consuming to input. By allowing the subscriber to specify a more meaningful short name which is equivalent to a longer version, such problems are alleviated. It will however be appreciated that there should preferably be some way of referencing filters stored at the broker. Additionally by storing filter expressions centrally in their parsed representation, the format of such expressions need be verified once only at specification time. This is far more appealing, than a runtime check. Especially where the filter is a common one, and the same filter would therefore have to be verified more than once.

In one embodiment, the subscriber is able to request a list of short names from the message broker. Explanatory text can also be provided alongside the short names, or even the corresponding long version of the filter.

In another embodiment a tool with a GUI front-end is used to select a filter(s) to subscribe to from the common set stored centrally. Registration of a subscription involves ticking an appropriate box(es) to specify which filter(s) are required.

Figure 7A:
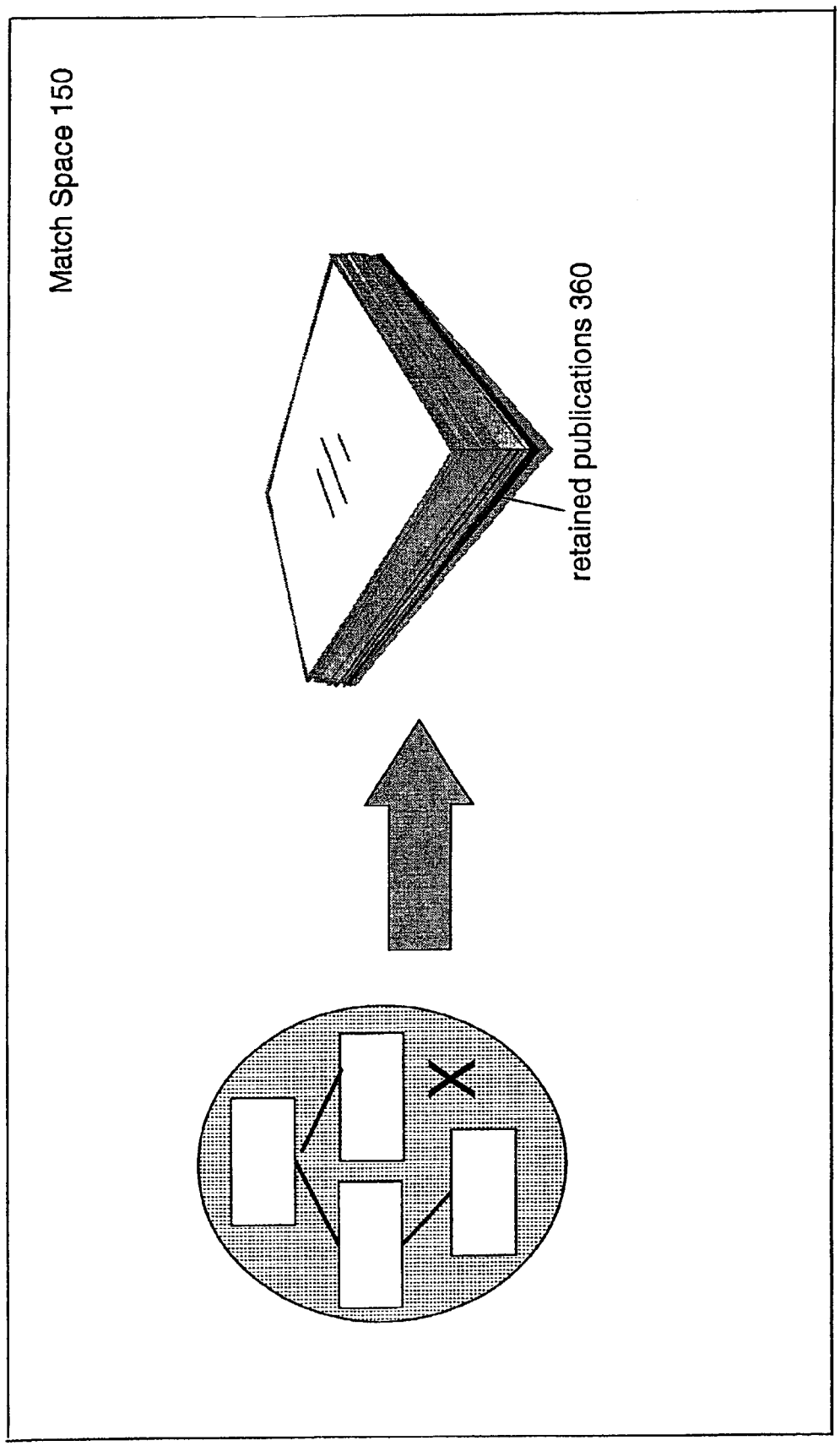

The storage of filters centrally at the broker is particularly advantageous in a retained publication system. It is possible to associate a set of retained publications 360 with each filter as shown in FIGS. 7*a* and 7*b*. The parsed form of the filter is associated with a relevant set of publications. Each set name (e.g. Set1) can then be associated with a list of documents comprising that set. Such a configuration means that filter parsing does not have to be done at subscription time and that evaluation of all publications stored at the broker does not have to be undertaken upon receipt of a new subscription. (This is so long as the subscription specifies a filter that already exists in its parsed representation at the broker and is already associated with a set of retained publications.) Note, some publications may be associated with more than one filter. Also, when a new publication is received at the broker, the overall hierarchical tree structure is parsed to determine which parts of the tree that publication should be associated with.

Thus to reiterate, preferably each publication set is associated with a filter and thereby a list of subscribers. The initially compiled set can then be forwarded off to the appropriate subscribers and further whenever a new publication is added to a set, this publication can be forwarded on to the relevant group of subscribers.

Further when a new subscription is received at the broker specifying a topic and filter, the processing is as follows. A parsed representation of the topic part is created and added into the overall hierarchical tree structure. An association is then created between this and the specified filter. The set of publications associated with the filter sub-tree are then searched to disregard any publications that are not relevant to the topic specified and the remainder are forwarded onto at least that subscriber. Or put another way, publications are only forwarded if they prove a match as regards to topic and filter. Of course if the filter specified is not already associated with a set of retained publications, all the retained publications will preferably need to be searched in order to look for matches.

By storing the filters centrally at the broker it is also possible to implement transient conditions and group conditions. Transient conditions will be dealt with first with reference to FIG. 8.

Figure 8:
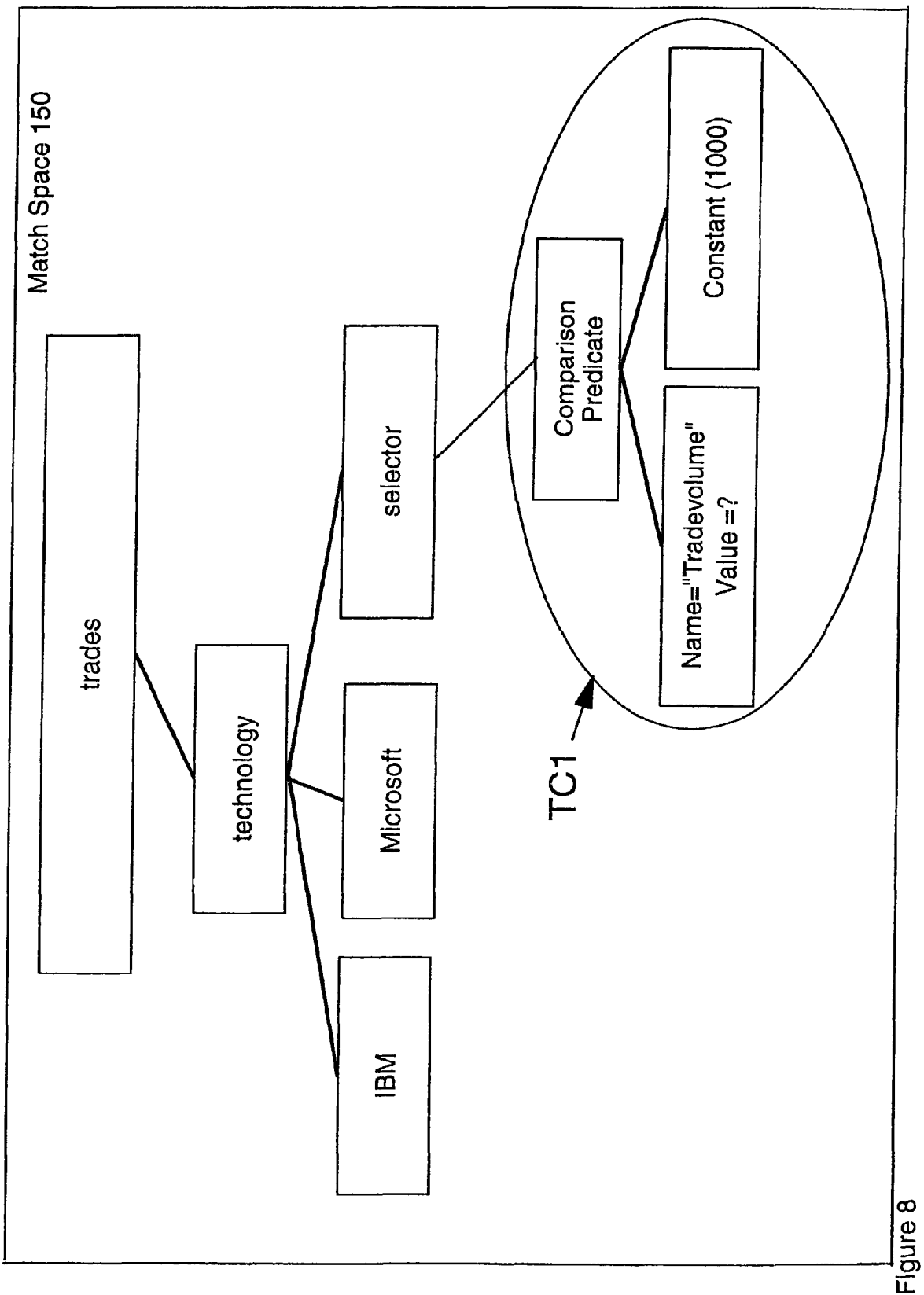
FIG. 8 shows the implementation of transient conditions in accordance with a preferred embodiment of the present invention.

FIG. 8 shows a parsed representation (e.g. tree structure) relating to stock & shares technology trades. (Preferably this complete structure has been created by a number of subscription registrations.) Depending from the technology node is an IBM node and also a Microsoft node (Microsoft is a trademark of Microsoft Corporation in the United States, other countries, or both). Subscriptions may, for example, refer to just the technology node (e.g. a subscription on topic technology/#, where the hash is a wildcard, such that all technology trade publications are returned to the relevant subscribers.) Subscribers may also refer to a subnode (e.g. a subscription on topic technology/IBM). Thus any publication relating to IBM trades is returned to subscribers who have registered an interest therein and the same is true with regard to Microsoft trades. Subscribers may of course, also specify filters. Note in this example the table(s) listing which subscribers to forward which publications to is associated with the technology node and not a selector node.

Also depending from the technology node is a selector node. The selector node points to a filter sub-tree TC1 (i.e. the parsed representation of a transient condition) which returns a value of TRUE thereto if the trade volume for a particular share is recorded in a particular publication as greater than 1000. This is an example of a transient condition. This TC1 filter could be part of the startup set, it could be a filter which a control centre user defines up front, but only deploys during peak periods, for example. In both cases the parsed representation would exist at the broker, but would not be hooked into the tree structure until required.

When a publication arrives at the broker, the tree is traversed as in the prior art and subscriptions are accumulated. The transient condition is then applied to the list of subscriptions accumulated from the relevant subtree. Thus in FIG. 8, the transient condition is applied subscribers who have registered to receive ANY technology trades. This is because the transient condition depends directly from the technology node. Due to the transient condition however, these subscribers will only receive publications relating to trades with a trade volume of greater than 1000.

Group conditions are also possible in the preferred embodiment. A group condition is a parsed filter (e.g. "TradeVolume>1000") which is only applied if a subscriber is a member of a particular group. Thus before forwarding a message on to a subscriber, a final check would be carried out to verify this. If a subscriber is found to be such a member, then the group condition filter is applied to the message to finally determine whether the message is forwarded on to that subscriber. Note, such group conditions may be transient.

The power of transient and group conditions is thus realised by the decoupling of filters from subscriptions. It is now much easier to apply such conditions to a whole set of subscriptions. The effect of a group/transient condition can be mimicked in prior art implementations by adjusting the filter in each of the set of subscriptions. But this can prove extremely tedious. Existing subscriptions have to be deregistered and the desired filter has to be added to any existing filter in each subscription. The subscription then has to be reregistered. This re-registration results in the subscription being parsed into the tree structure if that part of the tree doesn't already exist, or at the very least a verification of the tree structure to determine this fact.

What is claimed is:

1. A computer-implemented method comprising:
receiving, at a document broker, a plurality of documents;
creating a main topic tree of filtering elements in the document broker;
parsing out a sub-tree from the main topic tree, wherein the sub-tree describes an authorization filter for a document supplied to the document broker and requested by a subscriber, and wherein the sub-tree is in an optimized format that is executable for filtering access to the document for the subscriber;
storing the sub-tree with the document broker under an alias name as an alias-named filter, wherein the alias-named filter is automatically permanently stored with the document broker after the subscriber causes a temporary storing of the sub-tree as the alias-named filter a pre-determined number of times; and
in response to a request from the subscriber for the alias-named filter, supplying the alias-named filter to the document broker to determine if the document is authorized to be supplied to the subscriber.

2. The computer-implemented method of claim 1, wherein the subscriber selects the alias-named filter from a list of subscriber developed alias-named filters.

3. The computer-implemented method of claim 2, wherein the subscriber developed alias-named filters includes a descriptive explanation of which types of documents a selected alias-named filter authorizes the document broker to supply to the subscriber.

4. The computer-implemented method of claim 1, wherein the alias-named filter is named and created when the subscriber initiates a subscription for document retrieval services with the document broker.

5. The computer-implemented method of claim 4, wherein the alias-named filter is subsequently available without re-subscribing for document retrieval services from the document broker.

6. The computer-implemented method of claim 1, wherein the alias-named filter is accessed by the document broker only during pre-defined peak activity periods for the document broker.

7. The computer-implemented method of claim 1, further comprising:
creating a topic branch tree that describes topics that describe documents that the subscriber is authorized to receive from the document broker, wherein each topic branch in the topic branch tree points to one of the alias-named filters.

8. The computer-implemented method of claim 1, wherein access to the document by the subscriber is according to a subscription topic supplied by the subscriber and the alias-named filter.

9. The computer-implemented method of claim 1, further comprising:
generating a first list of subscribers who have requested specific alias-named filters in the past;
generating a second list of subscribers who have not requested specific alias-named filters in the past; and
filtering, at the document broker, requested documents according to whether a requesting subscriber is on the first or second list.

10. The computer-implemented method of claim 1, wherein a specific alias-named filter for the subscriber is not hooked into a tree structure that defines all authorizations for the subscriber until the subscriber requests a document from the document broker.

11. A computer-usable non-transitory medium embodying computer program code, the computer program code comprising computer executable instructions configured to:
receive, at a document broker, a plurality of documents;
create a main topic tree of filtering elements in the document broker;
parse out a sub-tree from the main topic tree, wherein the sub-tree describes an authorization filter for a document supplied to the document broker and requested by a subscriber, and wherein the sub-tree is in an optimized format that is executable for filtering access to the document for the subscriber;
store the sub-tree with the document broker under an alias name as an alias-names filter, wherein the alias-named filter is automatically permanently stored with the document broker after the subscriber causes a temporary storing of the sub-tree as the alias-named filter a pre-determined number of times; and
in response to a request from the subscriber for the alias-named filter supply the alias-named filter to the document broker to determine if the document is authorized to be supplied to the subscriber.

12. The computer-usable non-transitory medium of claim 11, wherein the subscriber selects the alias-named filter from a list of subscriber developed alias-named filters.

13. The computer-usable non-transitory medium of claim 12, wherein the subscriber developed alias-named filters includes a descriptive explanation of which types of documents a selected alias-named filter authorizes the document broker to supply to the subscriber.

14. The computer-usable non-transitory medium of claim 11, wherein the alias-named filter is named and created when the subscriber initiates a subscription for document retrieval services with the document broker.

15. The computer-usable non-transitory medium of claim 14, wherein the alias-named filter is subsequent available without re-subscribing for document retrieval services from the document broker.

16. The computer-usable non-transitory medium of claim 11, wherein the alias-named filter is accessed by the document broker only during pre-defined peak activity periods.

17. The computer-usable non-transitory medium of claim 11, wherein the embodied computer program code further comprises computer executable instructions configured to:

create a topic branch tree that describes topics that describe documents that the subscriber is authorized to receive from the document broker, wherein each topic branch in the topic branch tree points to one of the alias-named filters.

18. The computer-usable non-transitory medium of claim 11, wherein the embodied computer program code further comprises computer executable instructions configured to:

generate a first list of subscribers who have requested specific alias-named filters in the past;

generate a second list of subscribers who have not requested specific alias-named filters in the past; and filter, at the document broker, requested documents according to whether a requesting subscriber is on the first of second list.

\* \* \* \* \*